US012717154B1

(12) United States Patent
Van Zeeland et al.

(10) Patent No.: US 12,717,154 B1
(45) Date of Patent: Aug. 25, 2026

(54) OPTICAL DEVICE FOR BEAM COMBINATION IN HETERODYNE INTERFEROMETERS AND POLARIMETERS AND ITS USE

(71) Applicant: General Atomics, San Diego, CA (US)

(72) Inventors: Michael Anthony Van Zeeland, San Diego, CA (US); Tsuyoshi Akiyama, San Diego, CA (US)

(73) Assignee: General Atomics, San Diego, CA (US)

(*) Notice: Subject to any disclaimer, the term of this patent is extended or adjusted under 35 U.S.C. 154(b) by 233 days.

(21) Appl. No.: 18/641,211

(22) Filed: Apr. 19, 2024

(51) Int. Cl.

| | |
|---|---|
| ***G02B 27/28*** | (2006.01) |
| ***G01N 21/45*** | (2006.01) |
| ***G02F 1/01*** | (2006.01) |
| ***G02F 1/11*** | (2006.01) |

(52) U.S. Cl.
CPC ........... *G02B 27/283* (2013.01); *G01N 21/45* (2013.01); *G02F 1/0136* (2013.01); *G02F 1/11* (2013.01); *G02F 2203/13* (2013.01)

(58) Field of Classification Search
CPC .......... G02B 27/283; G02B 2027/0194; G02B 2027/013; G01N 21/45; G02F 1/0136; G02F 1/125; G02F 2203/13
See application file for complete search history.

(56) References Cited

U.S. PATENT DOCUMENTS 6,288,831 B1 * 9/2001 Iizuka .................... G02F 1/11 359/305
6,618,070 B2 * 9/2003 Fischer .............. H04N 1/00278 347/255
2009/0262629 A1 * 10/2009 Yamasaki ............ G11B 7/1395
2021/0003763 A1 * 1/2021 Sasaki .................... G03H 1/265

OTHER PUBLICATIONS

Akiyama et al; "A Heterodyne Dispersion Interferometer for Wide Bandwidth Density Measurements on DIII-D"; Review of Scientific Instruments; Jul. 24, 2018.
Akiyama et al; "Bench Testing of a Heterodyne CO2 Laser Dispersion Interferometer for High Temporal Resolution Plasma Density Measurements"; Review of Scientific Instruments; Dec. 8, 2016.

(Continued)

*Primary Examiner* — Jia X Pan
(74) *Attorney, Agent, or Firm* — Fitch, Even, Tabin & Flannery LLP

(57) ABSTRACT

The present disclosure describes systems and methods for laser diagnostics systems (e.g., systems and methods for beam combination in heterodyne interferometers and polarimeters). For instance, a laser beam combiner, including a modulator and a wedge combiner, may be implemented in a heterodyne dispersion interferometer. In some cases, a modulator receives laser light (e.g., the laser light having a combination of a vertical polarization component and a horizontal polarization component) and the modulator shifts a frequency of the laser polarization components relative to the other. A wedge combiner having an index of refraction, and the wedge combiner comprises a mirror surface coating a and transmissive surface coating configured to effectively combine different polarization components of the laser light using transmission and reflection techniques, according to embodiments described herein.

24 Claims, 12 Drawing Sheets

(56) References Cited

OTHER PUBLICATIONS

Balbinot et al; "Dispersion Scanning Beam Medium Infra-Red Interferometry for Divertor Plasma Density Measurement in DTT"; Journal of Instrumentation; Feb. 19, 2020.
Lee et al; "The New Single Crystal Dispersion Interferometer Installed on KSTAR and its First Measurement"; Review of Scientific Instruments; Mar. 17, 2021 ; 7 pages.

* cited by examiner

PRIOR ART

Combined Beams
for Plasma Leg 920-a $\omega_2 + \omega_{2b}$ 910-a

915

$\omega_1 + \omega_{1b}$ 920-b 905-a $\omega_2$ $\omega_1$ 910-b 905-b

Combined Beams
for Reference Leg

OPTICAL DEVICE FOR BEAM COMBINATION IN HETERODYNE INTERFEROMETERS AND POLARIMETERS AND ITS USE

BACKGROUND

1. Field of the Invention

The present invention relates generally to laser-based diagnostics, and more specifically to laser-based interferometer and polarimeter diagnostics.

2. Discussion of the Related Art

Laser-based interferometers and polarimeters are widely used in various scientific and industrial applications for measuring optical path length variations as well as a birefringence of materials, respectively. The obtainable precision of these systems is often limited by alignment accuracy of the system components. Accordingly, there is persistent demand for advanced diagnostic approaches that overcome existing alignment challenges and facilitate more precise and robust alignment.

SUMMARY

The present disclosure describes a laser beam combination method that can be used for a two-color heterodyne interferometer (e.g., a heterodyne dispersion interferometer) or polarimeter. Embodiments of the present disclosure include laser diagnostics systems that may be configured to reduce signal drift and noise (e.g., of interferometers). Additionally, laser diagnostics systems of the present disclosure may enable users to perform beam alignment efficiently, for example, by using a single unit packaging optics.

An apparatus, system, and method for laser diagnostics for a dispersion interferometer is described. One or more aspects of the apparatus, system, and method include a modulator configured to receive laser light having a combination of both a vertical polarization component and a horizontal polarization component, wherein the modulator shifts a frequency of one of the vertical polarization component and the horizontal polarization component relative to the other; and a wedge combiner having an index of refraction and comprising a first surface coating on one side of the wedge combiner comprising a mirror coating and a second surface coating on another side of the wedge combiner comprising a transmissive coating producing total transmission of a P-polarization component at Brewster's angle of incidence and producing total reflection of an S-polarization component at a different angle of incidence, wherein the laser light having the P-polarization component on the second surface is reflected by the first surface on the one side, wherein the laser light having S-polarization component on the second surface is reflected by the second surface on the other side, wherein and the laser light having P polarization is incident on the second surface combines with the laser light having S polarization as the laser light having P polarization is incident on the second surface and the laser light having S polarization departs the wedge combiner.

DETAILED DESCRIPTION

Figure 1:
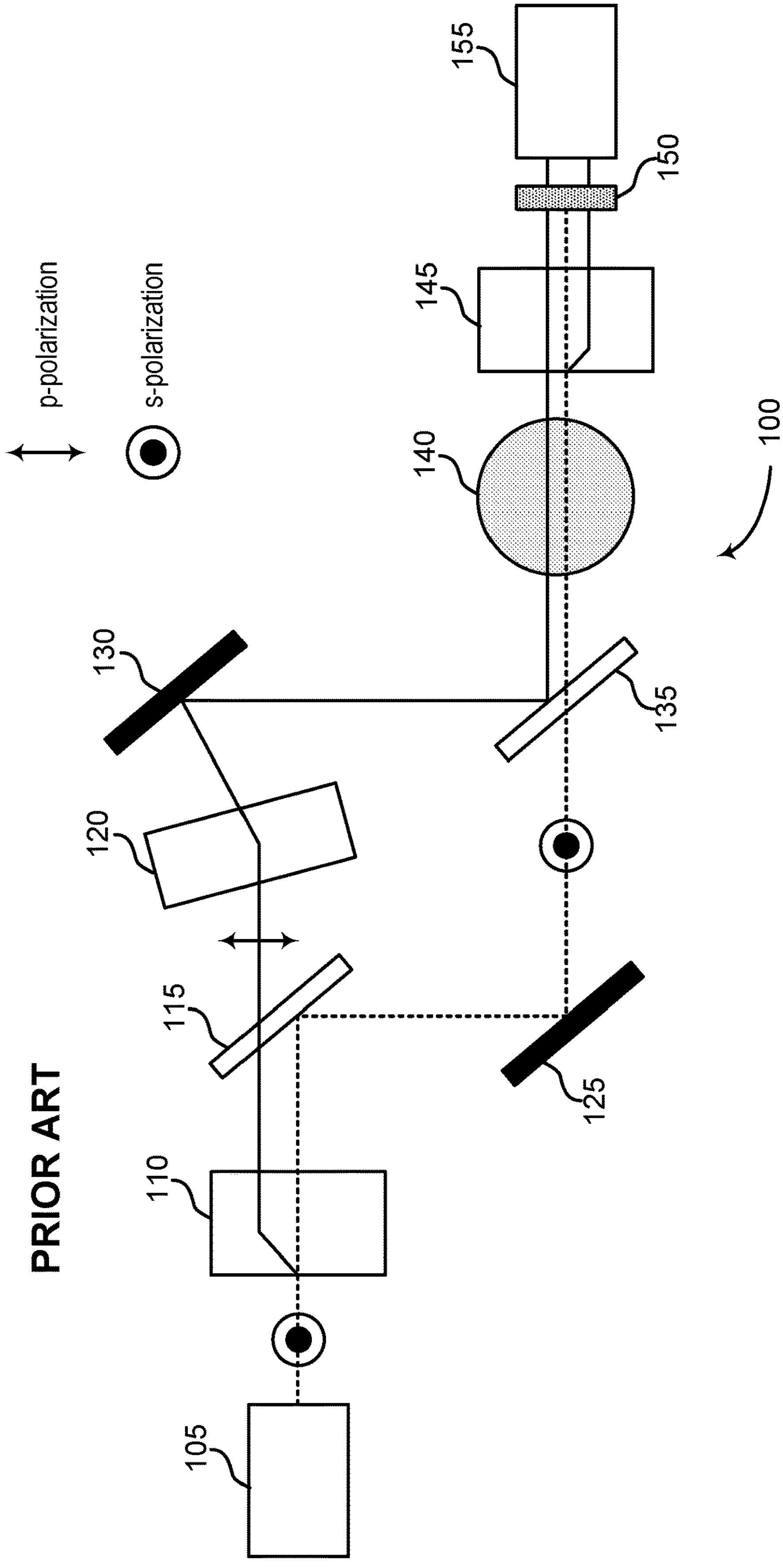
FIG. 1 shows an example of a heterodyne dispersion interferometer according to aspects of the prior art.

The present disclosure describes laser diagnostics systems and laser beam combination methods (e.g., that may be implemented for a two-color heterodyne interferometer, a heterodyne dispersion interferometer, polarimeter etc.) or polarimeter. For instance, embodiments of the present disclosure include laser diagnostics systems configured to reduce signal and drift noise of interferometers. Additionally, laser diagnostics systems described herein may enable users to perform beam alignment efficiently, for example, by using a single unit packaging optics.

Dispersion interferometry has gained significant importance in diverse areas such as material characterization, and remote sensing, among others. This technology relies on the measurement of phase shifts in a laser light as it propagates through a sample.

In some cases, a laser interferometer measures the phase shift of the probe laser light in order to evaluate the index of refraction of a material. For example, a desired physical quantity can be evaluated from the measured index of refraction. In some examples, the electron density of a plasma for use in nuclear fusion is obtained from the phase shift measurement performed by the interferometer. In some cases, the phase shift is caused by the change of the optical path length of the laser light due to mechanical vibration of optics as well as the change in the electron density. Accordingly, a two-color interferometer includes simultaneous use of two laser lights with different wavelengths such that the phase shifts caused by the electron density and the mechanical vibration are separated.

In the case of a two-color interferometer, the two different laser lights must overlap precisely. And, path lengths and the number/amount of optics before the overlapping should be minimized. In some cases, ambient changes and mechanical vibrations before overlapping, which cannot be separated, are non-negligible, e.g., when path lengths and number/amount of optics before the overlapping are not minimized.

The present disclosure describes systems and methods for laser diagnostics systems (e.g., systems and methods for beam combination: interferometers, including a heterodyne dispersion interferometer, and polarimeters).

As described herein, a laser beam combiner, including a modulator and a wedge combiner, may be implemented in a heterodyne dispersion interferometer. For instance, laser light may have a combination of a vertical polarization component and a horizontal polarization component. Embodiments of the present disclosure include a modulator configured to receive laser light and shift a frequency of one of the laser polarization components relative to the other. Additionally, a wedge combiner has an index of refraction, and the wedge combiner comprises a mirror surface coating and a transmissive surface coating configured to effectively combine different polarization components of the laser light using transmission and reflection techniques.

In some aspects, the wedge combiner may minimize the path length before the combination, and two laser lights can share the same optical components. According to some embodiments, the interferometers may combine two laser lights with different wavelengths. In some cases, the path lengths before the combination should be minimized to reduce the noise. One or more embodiments include a plug-and-play device comprising the wedge combiner that can be provided to the users to perform faster and easier beam alignment. Additionally, the laser beam combination method can improve a resolution of a heterodyne dispersion interferometer.

Therefore, by using a wedge combiner with a suitable coating and an appropriate wedge angle, embodiments of the disclosure can improve a resolution of a heterodyne dispersion interferometer. That is, a measurement noise and a signal drift can be reduced due to largely common path and optics and no sensitivity to optical component vibration. In some cases, the beam combination parts including the wedge combiner can be assembled in a single unit. Additionally, the wedge combiner can be included in a "plug and play" unit that enables users to perform easier and faster beam alignment. In some examples, the beam combination parts may be used for diagnostics of fusion or low temperature plasma and inspection of optical material and gases in a factory. Due to its simple configuration, the beam combination parts can be included in an interferometer kit provided by a manufacturer.

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, however, that the invention can be practiced without one or more of the specific details, or with other methods, components, materials, and so forth. In other instances, well-known structures, materials, or operations are not shown or described in detail to avoid obscuring aspects of the invention.

A Laser Diagnostics System

As disclosed herein, the laser diagnostics system includes a laser beam combination method that can be used for a two-color heterodyne interferometer, a heterodyne dispersion interferometer, or a polarimeter. According to some aspects of the present disclosure, the laser diagnostics system can reduce a signal drift and noise in the interferometers and polarimeters, as well as enabling users to perform beam alignment easily by using a single unit packaging optics. Additionally, aspects of the present disclosure include a wedge combiner that includes special coatings and a predefined wedge angle. In some cases, interferometers may combine two laser lights with different wavelengths, i.e., the wedge combiner can minimize the path length before the combination, and the two laser lights can share the same optical components.

FIG. 1 shows an example of a heterodyne dispersion interferometer according to aspects of the prior art. In some cases, a heterodyne dispersion interferometer (hereinafter, HDI) uses an acoustic-optical cell (AOC) for heterodyne detection.

An interferometer is a tool that enables measurement of changes in dispersion. In some cases, it is used for the measurement of electron density measurement in plasma research. An interferometer may be used for future fusion reactors. A heterodyne dispersion interferometer (HDI) is an optical measurement instrument used for extremely precise measurements, e.g., index of refraction measurements. It is designed to measure minute changes in the optical path length of a sample or target by exploiting the dispersion properties of the material.

Heterodyne dispersion interferometers typically use a laser as the light source. The laser light is injected into a nonlinear crystal to generate the second harmonic component. The fundamental and the second harmonic components are separated once, and the frequency of either the fundamental or the second harmonic component only shifts. (The frequency of the second harmonic component is shifted in FIG. 1.) These two laser lights are combined again and are directed toward a sample or target whose index of refraction is being measured. Depending on the properties of the sample material, the laser lights' phases may be altered, and the phase shifts of the two laser lights are different from one another because of the dispersion of the material. The second nonlinear crystal generates the second harmonics from the fundamental component. The interference of the two second-harmonic components is detected, and the signal carries information about the phase shift between the two laser light components; hence, information about the index of refraction of the sample is thereby obtained.

An AOC, or an acousto-optic modulator (AOM), or a Bragg cell, or an acousto-optic deflector (AOD) uses the acousto-optic effect to diffract and shift the frequency of laser using sound waves (usually at radio-frequency). The AOCs are used for Q-switching, in lasers telecommunications for signal modulation, and in spectroscopy for frequency control. A piezoelectric transducer is attached to a material such as glass. An oscillating electric signal drives the transducer to vibrate, which creates sound waves in the material. These can be considered as moving periodic planes of expansion and compression that change the index of refraction.

In one aspect, the heterodyne dispersion interferometer includes a laser diagnostics system 100 comprising laser source 105, first frequency doubler 110, beam splitter 115, modulator 120, first mirror 125, second mirror 130, beam combiner 135, second frequency doubler 145, filter 150, and detector 155. Also shown is plasma 140. Laser diagnostics system 100 is an example of, or includes aspects of, the corresponding element described with reference to FIGS. 2-11.

Laser source 105 is a device that emits light through a process of optical amplification based on the stimulated emission of electromagnetic radiation. The term "laser" originated as an acronym for "light amplification by stimulated emission of radiation." The laser source 105 is an example of or includes aspects of, the corresponding element described with reference to FIGS. 6, and 8-11.

According to some aspects, the first frequency doubler 110 may refer to a non-linear crystal that generates a second harmonic component. Additionally, second frequency doubler 145 may be used for performing second harmonic generation from the fundamental component with another non-linear crystal after the plasma. For example, referring to FIG. 1, the dotted line indicates the fundamental component of the laser light and the solid line indicates the second harmonic component of the laser light. First frequency doubler 110 is an example of or includes aspects of, the corresponding element described with reference to FIG. 6. Second frequency doubler 145 is an example of, or includes aspects of, the corresponding element described with reference to FIG. 6.

According to some aspects, beam splitter 115 may perform a separation of fundamental and second harmonic components of the laser light. Beam splitter 115 is an example of, or includes aspects of, the corresponding element described with reference to FIGS. 2.

According to some aspects, modulator 120 is configured to receive laser light having a combination of both a S-polarization component and a P-polarization component, wherein the modulator 120 shifts a frequency of one of the S-polarization component and the P-polarization component relative to the other. In some aspects, the modulator 120 includes an acoustic-optical cell. In some aspects, the laser light has a frequency in a range from 25 Terahertz and 600 Terahertz, e.g., 31.4 Terahertz, or 282 Terahertz. In some aspects, the laser light has the first frequency where the first frequency is approximately 62.5 Terahertz. In some aspects, the laser light has the second frequency where the second frequency is approximately 31.4 Terahertz. In some aspects, the modulator 120 has a drive frequency in a range from 10 Megahertz to 200 Megahertz. In some aspects, the modulator 120 separates the laser light into orthogonal polarization components by angles in a range of 0.3 to 15 degrees. In some aspects, the modulator 120 is configured to receive laser light having both the first frequency and the second frequency, where the first frequency is a second harmonic of the second frequency. Modulator 120 is an example of, or includes aspects of, the corresponding element described with reference to FIGS. 2-11.

According to some aspects, first mirror 125 and second mirror 130 may perform a reflection of the fundamental and second harmonic components of the laser light. First mirror 125 is an example of, or includes aspects of, the corresponding element described with reference to FIG. 2. Second mirror 130 is an example of, or includes aspects of, the corresponding element described with reference to FIG. 2.

According to some aspects, beam combiner 135 may combine the fundamental and second harmonic components of the laser light. In some aspects, beam combiner 135 may perform a recombination of two components and propagation through plasma. Beam combiner 135 is an example of, or includes aspects of, the corresponding element described with reference to FIG. 2.

According to some aspects, plasma 140 gives each laser frequency component a respective frequency-based phase shift. In some examples, a second nonlinear crystal 145 generates a separate second harmonic component after passing through plasma 140.

Plasma 140 is an example of, or includes aspects of, the corresponding element described with reference to FIGS. 6 and 11.

In some aspects, filter 150 is configured to remove the fundamental component of the laser light. According to some examples, an interference signal is measured between two second harmonic components generated before and after the plasma passage after removal of the fundamental component. Filter 150 is an example of, or includes aspects of, the corresponding element described with reference to FIG. 6.

According to some aspects, detector 155 is configured to perform a detection of the interference signal between two second harmonics. In some examples, the two second harmonics include the phase shift by the plasma. Detector 155 is an example of, or includes aspects of, the corresponding element described with reference to FIG. 6.

Therefore, the phase shift caused by the mechanical vibration of the optical components is canceled since most optical paths of the fundamental and the second harmonic components are common. Additionally, the phase shift caused by a plasma depends on wavelength, and hence, the phase shifts in the two frequencies are different. Since the phase of the interference signal is the difference in phases of two second-harmonic components, the phase shifts caused by vibrations are canceled because they are common, and the phase shifts caused by a plasma remain.

Figure 2:
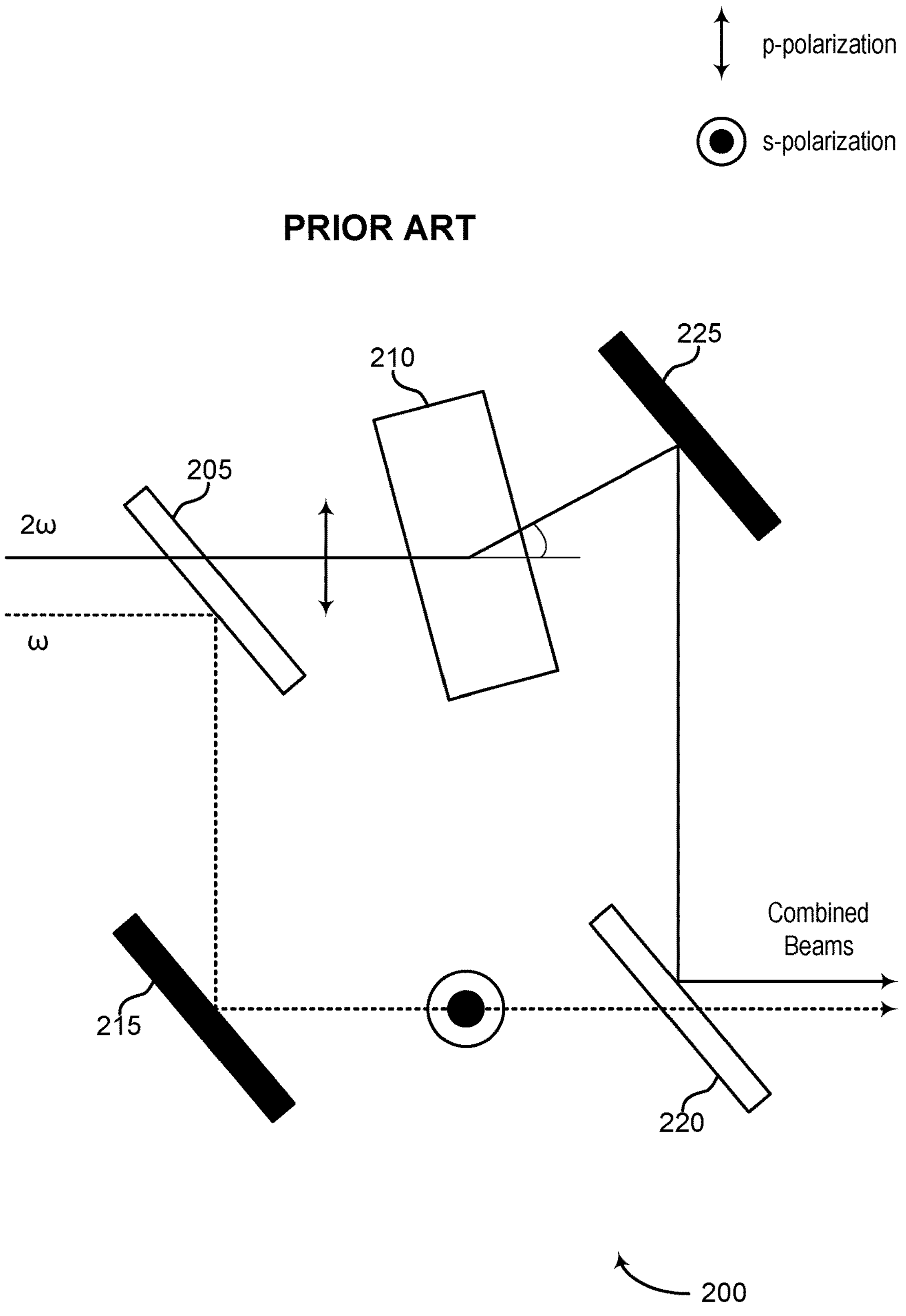
FIG. 2 shows an example of a modulator system according to aspects of the prior art.

FIG. 2 shows an example of a modulator system 200 according to aspects of the prior art. The modulator system 200 shows details of the modulator of FIG. 1.

Modulator system 200 is an example of, or includes aspects of, the corresponding element described with reference to FIGS. 1, and 3-11. In one aspect, modulator system 200 includes beam splitter 205, modulator 210, first mirror 215, beam combiner 220, and second mirror 225. Beam splitter 205 is an example of, or includes aspects of, the corresponding element described with reference to FIGS. 1. Modulator 210 is an example of, or includes aspects of, the corresponding element described with reference to FIGS. 1, and 3-11. First mirror 215 is an example of, or includes aspects of, the corresponding element described with reference to FIG. 1. Beam combiner 220 is an example of, or includes aspects of, the corresponding element described with reference to FIG. 1. Second mirror 225 is an example of, or includes aspects of, the corresponding element described with reference to FIG. 1.

Referring to FIG. 2, a fundamental component of the laser light (wavelength: ω) and a second harmonic component (wavelength: 2ω) of the laser light generated by a first frequency doubler (e.g., first frequency doubler 110 as described with reference to FIG. 1) are incident on beam splitter 205. In some examples, the second harmonic component of the laser light may refer to a P-polarization component. Similarly, the fundamental component of the laser light may refer to an S-polarization component. As seen in the figure, the fundamental and the second harmonic components overlap (i.e., overlapping satisfactorily) after the frequency doubler.

The S-polarization component and P-polarization component are terms used to describe the behavior of polarized light when it interacts with a material or surface, especially in the context of reflection and transmission. The S-polarization component is the component of polarized light or electromagnetic waves whose electric field vibrates perpendicular to the plane of incidence. The P-polarization component is the component of polarized light or electromagnetic waves whose electric field vibrates parallel to the plane of incidence. That is, when light is incident at an angle on a surface, a portion of it can be polarized in the direction perpendicular to the surface (i.e., S-polarization component) and another portion of it can be polarized in the direction parallel to the surface (i.e., P-polarization component).

The S-polarization component and P-polarization component refer to the orientation of the electric field vectors of the incident light relative to the plane of incidence. In S-polarization, the electric field vector of the incident light or wave is perpendicular (transverse) to the plane of incidence. When light is incident at the Brewster's angle, it is purely S-polarized in the reflected direction. In P-polarization, the electric field vector of the incident light or wave is parallel to the plane of incidence. P-polarization is generally more transmissive at the Brewster's angle compared to S-polarization.

Brewster's angle refers to the behavior of light when it encounters the interface between two different optical media, typically air and a transparent material like glass or water. At the Brewster's angle, certain polarizations of incident light are completely transmitted without any reflection. That is, Brewster's angle is the specific angle of incidence at which light strikes the interface between two media. In some cases, the Brewster's angle is the angle at which reflected light becomes completely polarized parallel to the interface between two optical media.

According to some examples, beam splitter separates the fundamental (indicated in dotted line) and second harmonic components (indicated by solid line). As seen in FIG. 2, the fundamental component is further reflected by first mirror 215 to reach beam combiner 220. Additionally, the second harmonic component passes through modulator 210 and a second mirror 225 to reach beam combiner 220. In some cases, the modulator 210 performs a frequency shift with the AO cell (AOC) of the second harmonic component. In some cases, for using the modulator system 200, two wavelength components are separated and recombined (using beam combiner 220) as they leave the modulator system 200.

In some examples, the beam separation region around the AOC may be a source of measurement error. That is, two wavelengths are separated once and then recombined which results in phase drifts that cause measurement errors. For example, two laser lights may not share some optical components and have different optical paths. Hence, the change of the path length due to the mechanical vibration and ambient changes (e.g., air flow, temperature, and humidity in the area) may not be cancelled and remain in the measured phase shift. The uncancelled phase shift leads to drifts and noise of the electron density measurements.

Figure 3:
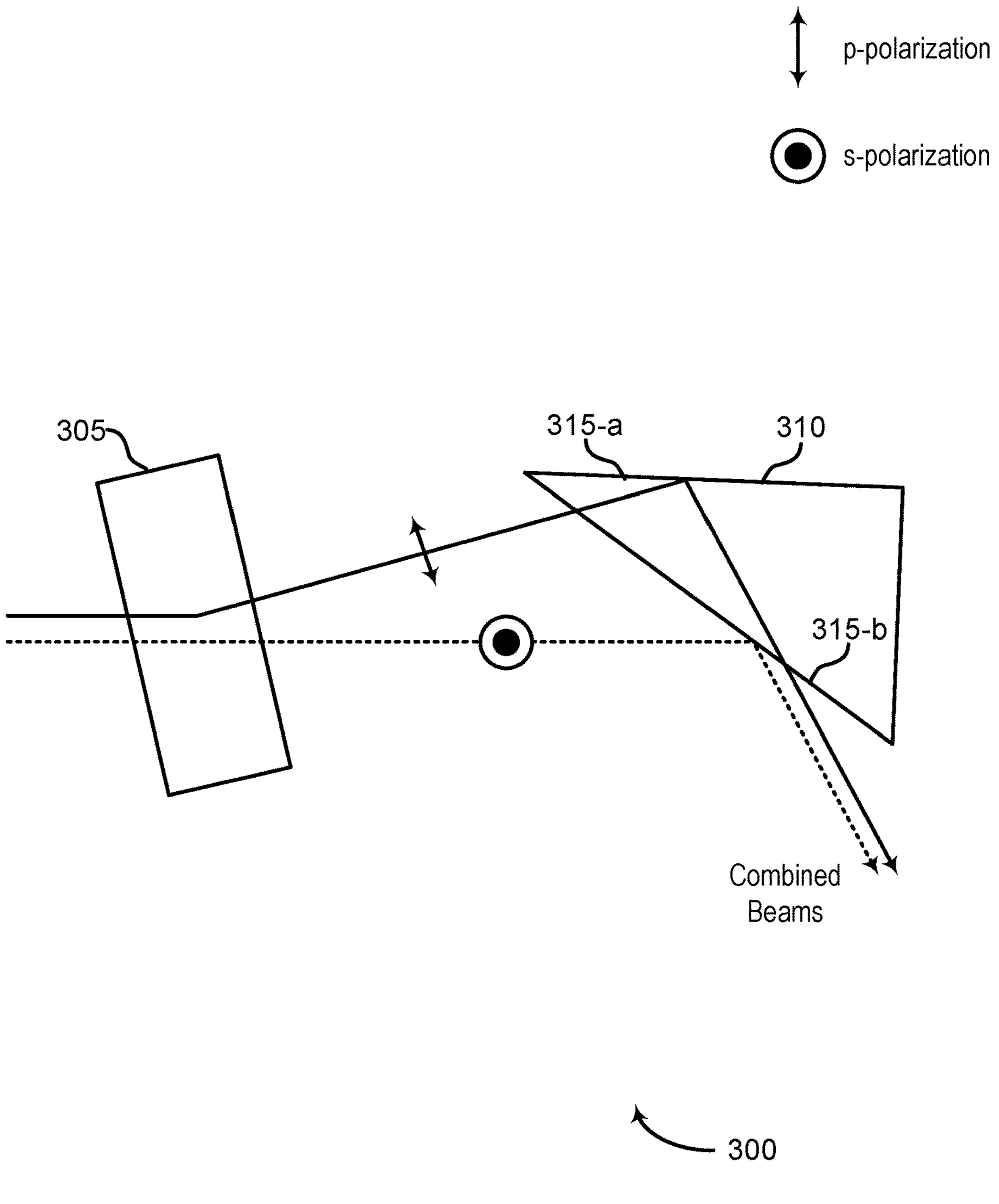
FIG. 3 shows an example of a wedge combiner unit according to aspects of the present disclosure.

FIG. 3 shows details of an example wedge combiner unit according to aspects of the present disclosure. Laser diagnostics system 300 is an example of, or includes aspects of, the corresponding element described with reference to FIGS. 4-6, and 8-11.

In one aspect, laser diagnostics system 300 includes modulator 305 and wedge combiner 310. According to an aspect, and as shown in FIG. 3, modulator 305 performs a frequency shift based on the AO cell to one of the wavelength components. For example, the frequency shift is performed on the second harmonic component of the laser light (indicated in solid line). Modulator 305 is an example of, or includes aspects of, the corresponding element described with reference to FIGS. 1, 2, and 4-11.

According to some aspects, wedge combiner 310 includes an index of refraction. In some examples, wedge combiner 310 comprises a mirror coating. In some examples, wedge combiner 310 comprises a transmissive coating producing total transmission of a P-polarization component (indicated in solid line) and producing total reflection of an S-polarization component (indicated in dotted line). In some aspects, the wedge combiner 310 includes a pre-defined wedge angle based on which the laser light having the second frequency is combined with the laser light having the first frequency to generate combined beams. In some examples, the wedge angle depends on the wavelength of the laser beam, material of the wedge combiner, and frequency of the modulator 305 (e.g., modulator AOC). Wedge combiner 310 is an example of, or includes aspects of, the corresponding element described with reference to FIGS. 4-6, and 8-11.

Therefore, inclusion of wedge combiner 310 for combining the two wavelengths eliminates the process of wavelength separation (as described with reference to FIG. 2). The error is minimized and the optics are shared between the two wavelengths resulting in minimum beam separation.

Therefore, embodiments of the present disclosure provide a laser beam combiner (e.g., a laser diagnostics system 300 or other laser diagnostics system described herein) comprising a modulator 305 and a wedge combiner 310. In some cases, a modulator 305 is configured to receive laser light having a combination of a vertical polarization component and a horizontal polarization component, wherein the modulator 305 shifts a frequency of one of the vertical polarization components and the horizontal polarization component relative to the other.

Additionally, the wedge combiner 310 includes an index of refraction and comprises a first side 315-*a* (e.g., with a first surface coating) and another side 315-*b* (e.g., with a second surface coating). In some cases, the first surface coating on one side (e.g., side 315-*a*) of the wedge combiner 310 comprising a mirror coating. The second surface coating on another side (e.g., side 315-*b*) of the wedge combiner 310 comprising a transmissive coating producing total transmission of a P-polarization component at Brewster's angle of incidence and producing total reflection of an S-polarization component at a different angle of incidence.

According to some embodiments, the laser light having the P-polarization component on the second surface is reflected by the first surface on the one side. In some cases, the laser light having S-polarization component on the second surface is reflected by said second surface on the other side. The laser light having P polarization as incident on the second surface combines with said laser light having S polarization as said laser light having P polarization is incident on the second surface and said laser light having S polarization departs said wedge combiner.

Figure 4A:
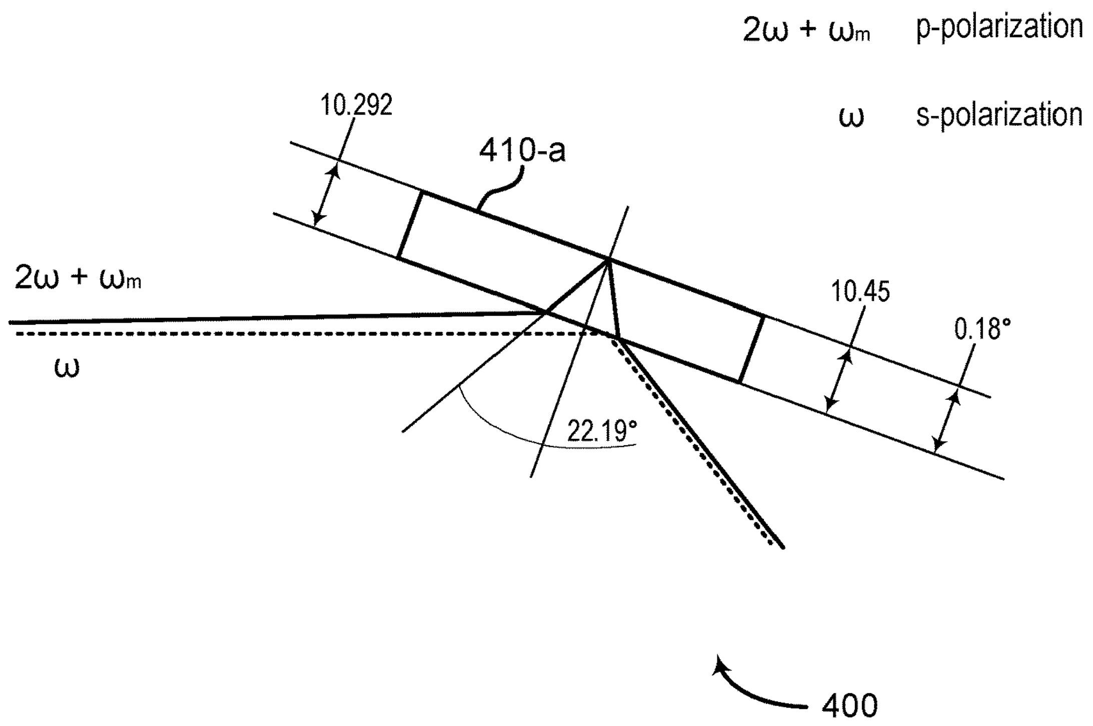
FIGS. 4A and 4B (also referred to collectively as FIG. 4) show an example of a wedge combining process according to aspects of the present disclosure.
Figure 4B:
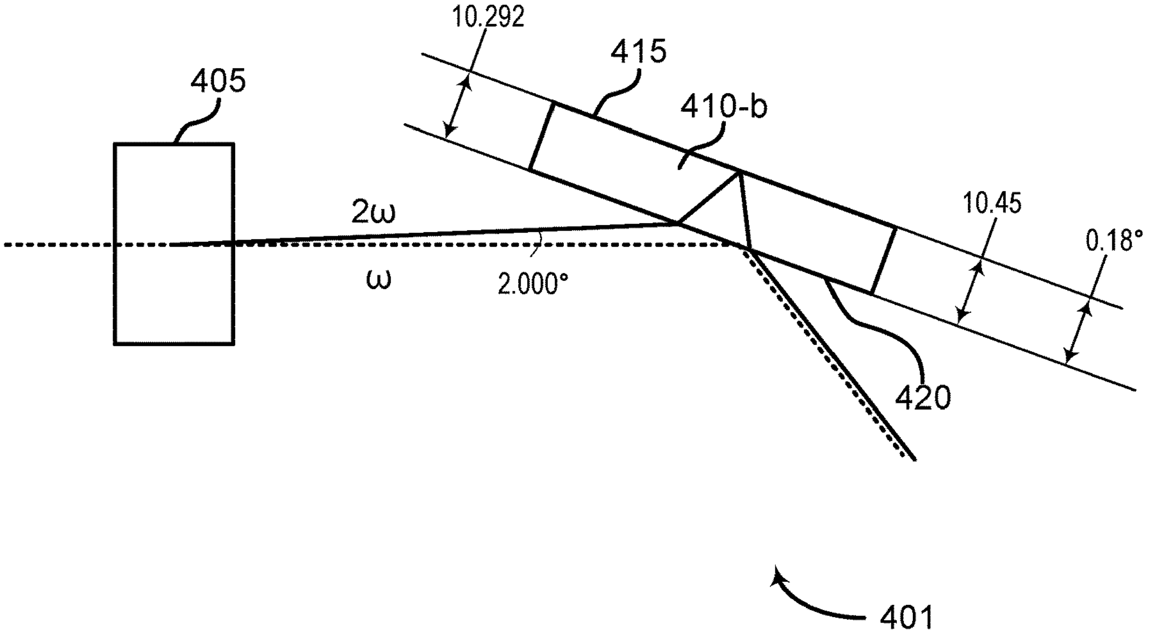

FIGS. 4A and 4B (FIG. 4) show an example of a wedge combining process according to aspects of the present disclosure. Laser diagnostics systems 400 and 401 in FIGS. 4A and 4B are examples of, or includes aspects of, the corresponding element described with reference to FIGS. 3 and 5-11.

In one aspect, laser diagnostics systems 400 and 401 includes modulator 405 and wedge combiner 410 (e.g., wedge combiner 410-*a* and wedge combiner 410-*b*). As shown in FIG. 4B, modulator 405 performs a frequency shift on the second harmonic component of the laser light (indicated in solid line) based on the AO. Modulator 405 is an example of, or includes aspects of, the corresponding element described with reference to FIGS. 1-3, and 5-11.

In some examples, wedge combiner 410 (i.e., 410-*a* and 410-*b*) comprises a transmissive coating producing total transmission of a P-polarization component (i.e., for second harmonic component of the laser light indicated in solid line) at Brewster's angle of incidence. Similarly, wedge combiner 410 (i.e., 410-*a* and 410-*b*) comprises a coating producing total reflection of an S-polarization component (i.e., for fundamental component of the laser light indicated in dotted line) at a different angle of incidence.

In one aspect, wedge combiner 410 includes first surface 415 and second surface 420. Referring to FIGS. 4A-B, the laser light having the P-polarization component on the second surface is reflected by the first surface 415 on the one side. Additionally, the laser light having S-polarization component on the second surface is reflected by the second surface 420 on the other side. First surface 415 is an example of, or includes aspects of, the corresponding element described with reference to FIG. 3. Second surface 420 is an example of, or includes aspects of, the corresponding element described with reference to FIG. 3.

In some aspects, the wedge combiner 410 includes a wedge angle that is configured to combine the laser light having the second frequency with the laser light having the first frequency. For example, the laser light having P-polarization as incident on the first surface combines with the laser light having S-polarization as as incident on the second surface. The combined P-polarization and S-polarization depart the wedge combiner 410.

In some aspects, the wedge combiner 410 includes two surfaces such that an angle between the one side and the other side is in a range between 0 and 2 degrees. In one specific example, the wedge combiner 410 is described, where an angle between the one side and the other side is 0.180 degrees. In some aspects, the laser light has a frequency in a range from 25 Terahertz and 600 Terahertz. In some aspects, the laser light has the first frequency where the first frequency is approximately 62.8 Terahertz. In some aspects, the laser light has the second frequency where the second frequency is approximately 31.4 Terahertz. Wedge combiner 410 is an example of, or includes aspects of, the corresponding element described with reference to FIGS. 3, 5, 6, and 8-11.

According to FIGS. 4A and 4B, wedge combiner 410 enables combining of two laser lights without separating them in advance. The mixed laser lights (i.e., fundamental and second harmonic components) are injected into the AOC (e.g., modulator 405) to shift the frequency of the second harmonic component. In some cases, the second harmonic component is diffracted. The wedge combiner 410 (i.e., 410-*a* and 410-*b*) with specific coating and wedge angle can combine the two beams. According to an exemplary embodiment, the beam diffraction angle of the second harmonic component (e.g., wavelength of 4.8 μm) is 2.0 deg. when the drive frequency of the AOC is 40 MHz.

In some examples, the material of the wedge combiner is ZnSe, which is a transparent material for infrared laser light. The fundamental and the second harmonic components are reflected by the surfaces 420 and 415, respectively. For example, considering the beam diffraction angle and the index of refraction of the ZnSe at 4.8 μm, the wedge angle is 0.18 deg. that is used to combine two laser lights. In some cases, the surfaces 415 and 420 have a specific coating to reduce loss of the laser lights. At surface 420, the fundamental component of the laser light is completely reflected and the second harmonic component is completely transmitted. The surface 420 of the wedge combiner satisfies Brewster's angle for the second harmonic component. The surface 415 includes a mirror coating, such that the second harmonic component is completely reflected. Thus, for a given design concept, the design parameters change according to the wavelength, the drive frequency, and the distance between the AOC and the wedge combiner.

Figure 5:
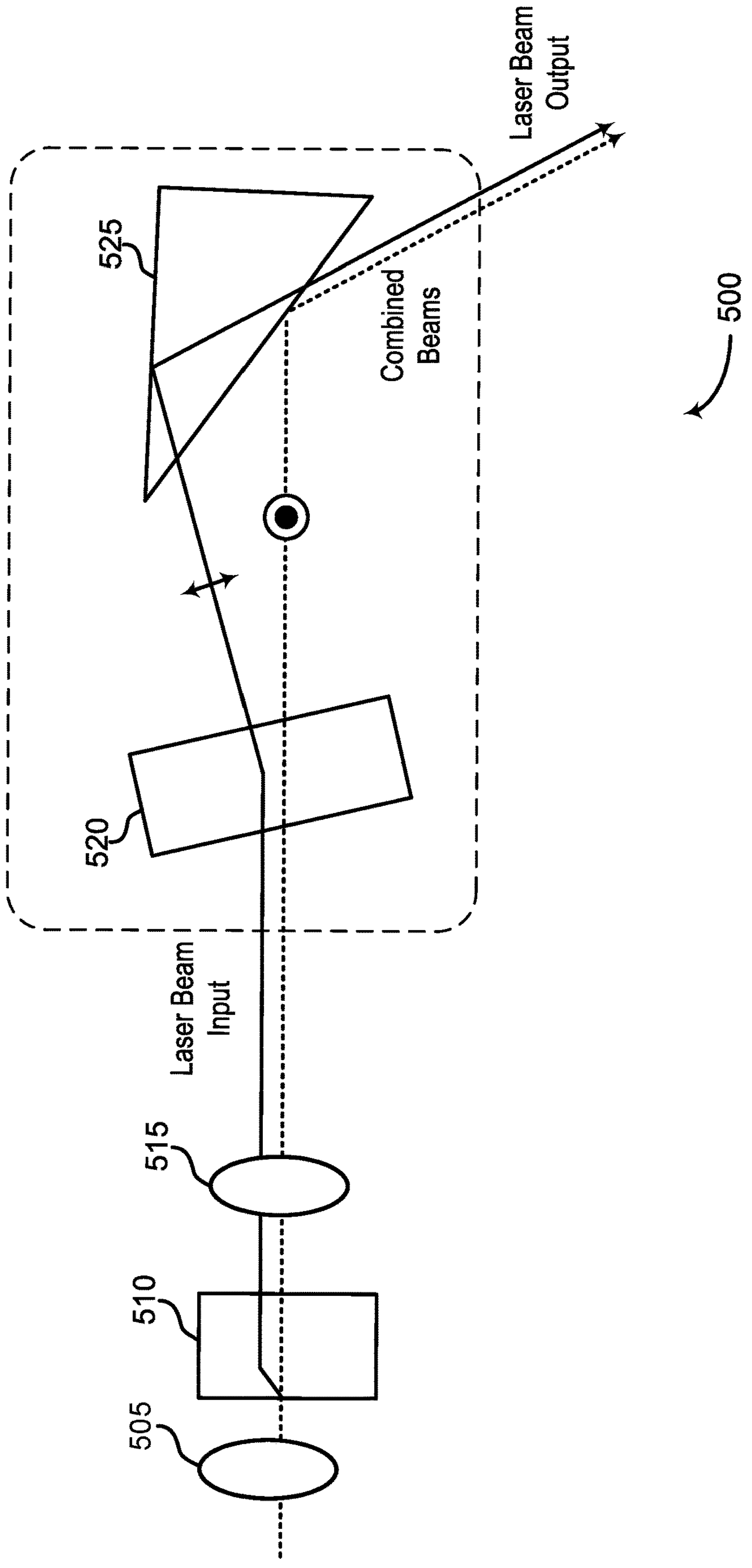
FIG. 5 shows an example of a minimum beam combination unit according to dispersion interferometer aspects of the present disclosure.

FIG. 5 shows an example of a beam combination unit according to aspects of the present disclosure. Laser diagnostics system 500 is an example of, or includes aspects of, the corresponding element described with reference to FIGS. 1-4, and 6-11.

In one aspect, laser diagnostics system 500 includes first convex lens 505, frequency doubler 510, second convex lens 515, modulator 520, and wedge combiner 525.

According to an aspect, first convex lens 505 and second convex lens 515 are aligned with frequency doubler 510. First convex lens 505 is an example of, or includes aspects of, the corresponding element described with reference to FIG. 6. Second convex lens 515 is an example of, or includes aspects of, the corresponding element described with reference to FIG. 6.

Frequency doubler 510 is an example of, or includes aspects of, the corresponding element described with reference to FIGS. 1-4. Modulator 520 is an example of, or includes aspects of, the corresponding element described with reference to FIGS. 1-4, and 6-11. Wedge combiner 525 is an example of, or includes aspects of, the corresponding element described with reference to FIGS. 3, 4, 6, and 8-11. Detailed descriptions of the frequency doubler, modulator, and wedge combiner have been provided with reference to FIGS. 1-4.

As shown in FIG. 5, single unit packaging beam combiner components are provided for user convenience. A minimum (single) unit includes modulator 520 (e.g., AOC modulator) and the wedge combiner 525. According to some embodiments, the components may be aligned (e.g., by a manufacturer) and a user may not need to perform precise beam alignment. Thus, a user can easily and quickly obtain a shifted frequency of the input laser beams and combined beams by providing the mixed laser light after the frequency doubler 510 to the input unit.

Figure 6:
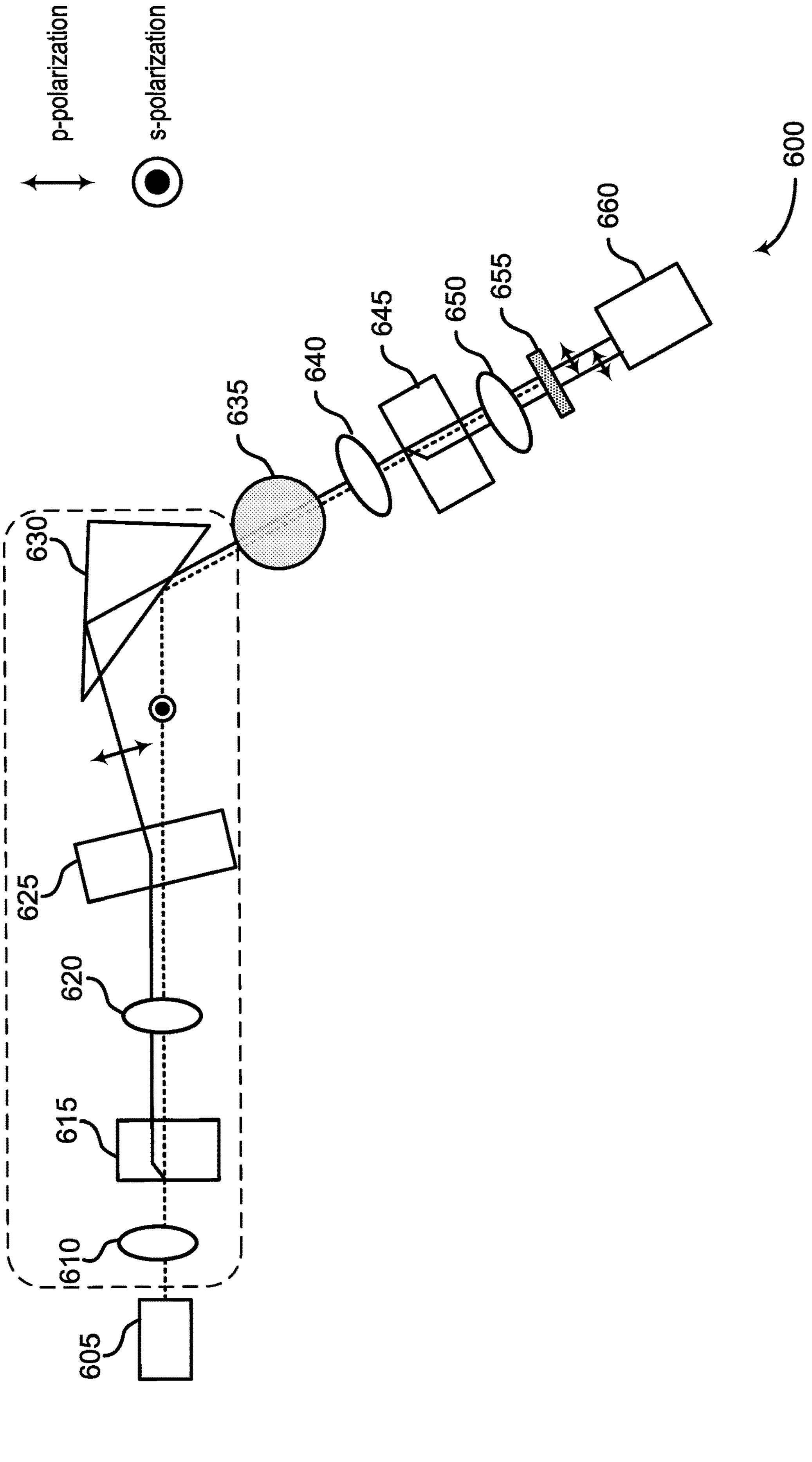
FIG. 6 shows an example of a heterodyne dispersion interferometer that utilizes a beam combination unit according to aspects of the present disclosure.

FIG. 6 shows an example of a heterodyne dispersion interferometer that utilizes a beam combination unit according to aspects of the present disclosure. Laser diagnostics system 600 is an example of, or includes aspects of, the corresponding element described with reference to FIGS. 1-5, and 7-11.

In one aspect, laser diagnostics system 600 includes laser source 605, first convex lens 610, first frequency doubler 615, second convex lens 620, modulator 625, wedge combiner 630, plasma 635, third convex lens 640, second frequency doubler 645, fourth convex lens 650, filter 655, and detector 660.

Laser source 605 is an example of, or includes aspects of, the corresponding element described with reference to FIGS. 1, and 8-11. First convex lens 610 is an example of, or includes aspects of, the corresponding element described with reference to FIG. 5. First frequency doubler 615 is an example of, or includes aspects of, the corresponding element described with reference to FIG. 1. Second convex lens 620 is an example of, or includes aspects of, the corresponding element described with reference to FIG. 5. Modulator 625 is an example of, or includes aspects of, the corresponding element described with reference to FIGS. 1-5, and 7-11.

Wedge combiner 630 is an example of, or includes aspects of, the corresponding element described with reference to FIGS. 3-5, and 8-11. Plasma 635 is an example of, or includes aspects of, the corresponding element described with reference to FIGS. 1 and 11. Second frequency doubler 645 is an example of, or includes aspects of, the corresponding element described with reference to FIG. 1. Filter 655 is an example of, or includes aspects of, the corresponding element described with reference to FIG. 1. Detector 660 is an example of, or includes aspects of, the corresponding element described with reference to FIG. 1. Each of the components in the laser diagnostics system have been described with reference to FIGS. 1-5.

According to an example, wedge combiner 630 may include a coating on each surface. For example, a second surface (as described with reference to FIGS. 3-4) may be used for transmission of P-polarization component of the laser beam (i.e., laser beam with wavelength 2ω and Brewster's angle for 2ω) and a complete or 100% reflection of S-polarization component of the laser beam (i.e., laser beam with wavelength ω).

Referring to FIG. 6, a schematic view of heterodyne dispersion interferometer that utilizes a beam combination unit. The description of FIG. 6 is substantially the same as that of FIGS. 1 and 5. Additionally, the HDI beam combination unit can include a fiber coupling based on user request. According to an embodiment, a fiber coupler couples free-space laser beams into fiber optic cables. A fiber coupler is an optical device used to combine or split optical signals traveling through multiple optical fibers. According to some examples, the fiber coupler system may take multiple input optical signals from different fibers and combines them into a single output fiber.

In some cases, the beam combination unit (e.g., laser diagnostics system 500 and 600 as described with reference to FIGS. 5-6) enables a reduction in user's beam alignment work for frequency shift, beam combination, and doubling. That is, the necessary alignment frequency mechanism is performed using various methods and an integrated unit is provided to the user. Thus, a user inputs laser light and can directly (and easily) obtain the desired beam for HDI.

Figure 7:
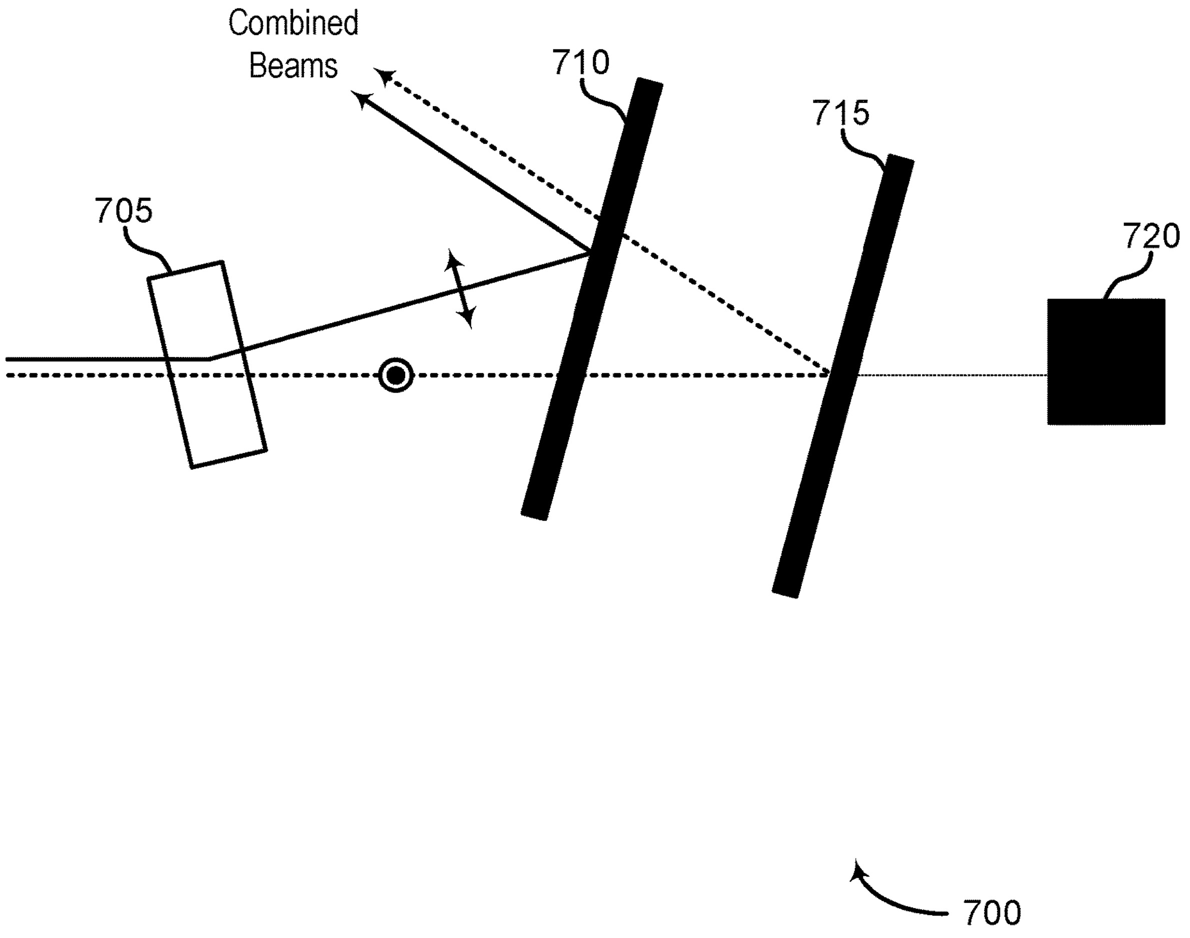
FIG. 7 shows an example of a method of generating combined beams according to aspects 4 present disclosure.

FIG. 7 shows an example of a method of generating combined beams according to aspects of the present disclosure. Laser diagnostics system 700 is an example of, or includes aspects of, the corresponding element described with reference to FIGS. 1-6, and 8-11.

In one aspect, laser diagnostics system 700 includes modulator 705, first beam splitter 710, second beam splitter 715, and beam dump 720. Modulator 705 is an example of, or includes aspects of, the corresponding element described with reference to FIGS. 1-6, and 8-11. In some variations, the beam splitter 715 is replaced by a mirror.

FIG. 7 refers to an alternative configuration to minimize the beam separation (as described with reference to FIG. 2). In some cases, the laser diagnostics system 700 provides an increased flexibility for a precise combination of the laser beams. In some cases, such a system includes a plurality of beam splitters (e.g., first beam splitter 710 and second beam splitter 715) instead of wedge combiner (e.g., wedge combiners described with reference to FIGS. 1-6) for generating combined beams.

As such, the configuration as described with reference to FIG. 7 is less affected by a manufacturing error of the wedge. Additionally, beam dump 720 may capture any beams that are not reflected by second beam splitter 715. In some cases, as in the configuration in FIG. 7, the optics are not shared between two wavelengths. Additionally, the vibrations in the two plates may not necessarily be common (i.e., unlike wedge combiners).

Figure 8A:
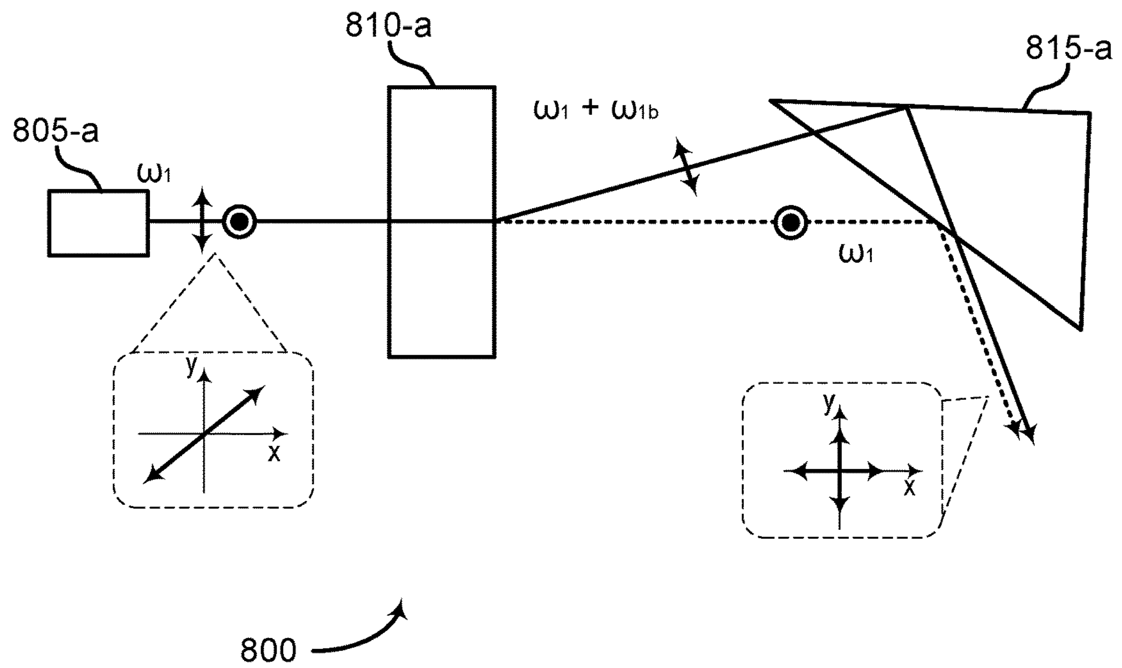
FIGS. 8A and 8B (also referred to collectively as FIG. 8 show an example of a heterodyne polarimeter that utilizes a beam combination unit according to aspects of the present disclosure.
Figure 8B:
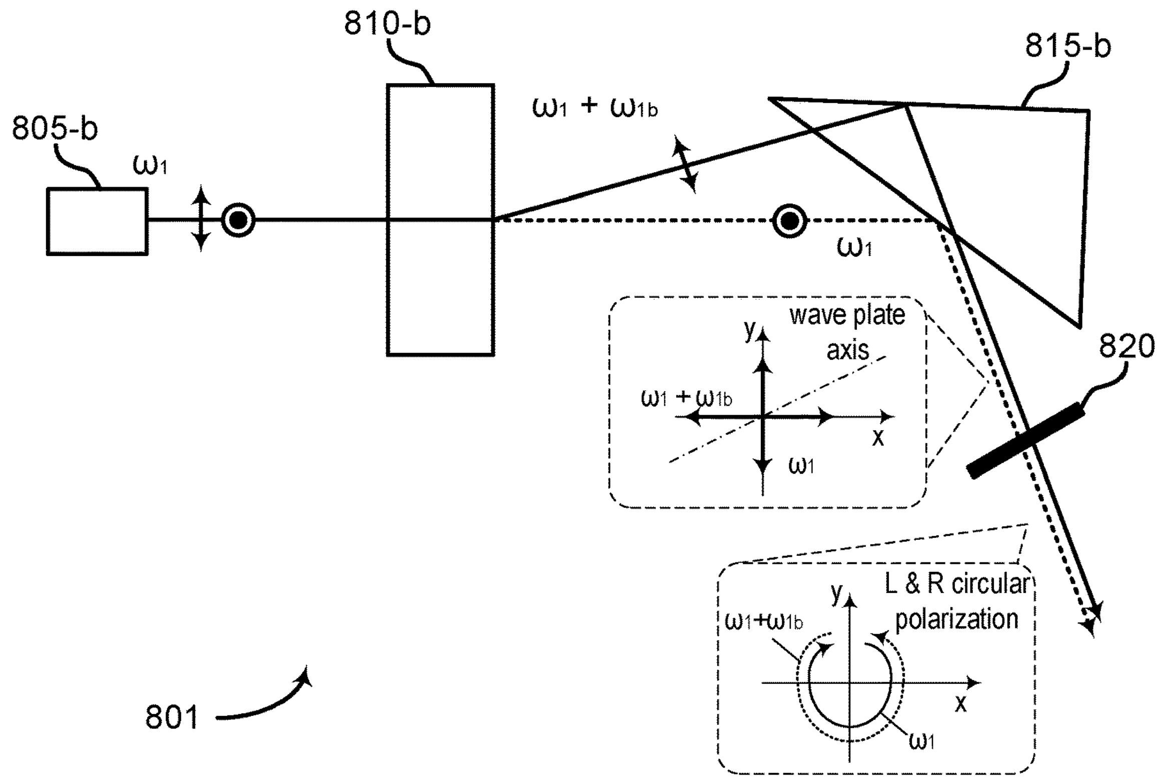

FIGS. 8A and 8B (FIG. 8) show an example of a heterodyne polarimeter that utilizes a beam combination unit 815 (wedge combiner 815) according to aspects of the present disclosure. Laser diagnostics systems 800 and 801 of FIGS. 8A and 8B are examples of, or includes aspects of, the corresponding element described with reference to FIGS. 1-7, and 9-11.

In one aspect, laser diagnostics system 800 includes laser source 805-*a*, modulator 810-*a*, and wedged plate 815-*a*. In one aspect, laser diagnostics system 801 includes laser source 805-*b*, modulator 810-*b*, wedged plate 815-*b*, and quarter wave plate 820. Laser source 805 is an example of, or includes aspects of, the corresponding element described with reference to FIGS. 1, 6, and 9-11. Modulator 810 is an example of, or includes aspects of, the corresponding element described with reference to FIGS. 1-7, and 9-11. Wedge combiner 815 is an example of, or includes aspects of, the corresponding element described with reference to FIGS. 3-6, and 9-11.

Referring to FIG. 8A, laser source 805-*a* generates laser light that includes S-polarization and P-polarization components. According to an embodiment, linear polarization is prepared at 45 degrees with regard to the modulator axis. In some cases, the laser diagnostics system 800 uses a single wavelength source and frequency shifts only one component of polarization before recombining. The form a Zeeman-like system and can be used recombined beams for polarimetry and/or interferometry.

The description of FIG. 8B may be substantially similar to FIG. 8A, except for the addition of a half-wave plate. Referring to FIG. 8B, half wave plate 820 is included after the wedged plate 815-*b*. That is, the combined beams generated from wedged plate 815-*b* are incident on the half-wave plate 820. The quarter wave plate 820 at 45 degrees creates right-hand and left-hand polarized light. In some cases, the created polarized light is offset in frequency by $\omega_{1b}$. According to some examples, the configuration in FIG. 8B can be used for R&L (Right-Handed and Left-Handed) wave heterodyne polarimetry.

A quarter-wave plate, also known as a quarter-wave retarder or λ/4 plate, is an optical device that is used to manipulate the polarization light. That is, a quarter-wave plate is an optical device that introduces a quarter-wavelength phase difference between two orthogonal components of polarized light. It is a type of waveplate with a specific thickness and optical properties that cause a 90-degree phase shift between the two orthogonal components of polarized light. This phase shift effectively transforms linearly polarized light into circularly polarized light or vice versa.

In some cases, R&L wave heterodyne polarimetry is a technique used in the field of polarimetry to measure the polarization state of electromagnetic waves (i.e., in the context of radio astronomy and astrophysics). Electromagnetic waves can have different polarization states. Polarization describes the orientation of the electric field vector in the wave, which can be linear, circular, or elliptical. In case of R&L wave heterodyne polarimetry, two waves with right-handed (R) and left-handed (L) circular polarization states are mixed to create a linear polarization which is rotating with a frequency of $\omega_{1b}$, providing for the measurement of the polarization angle.

Figure 9:
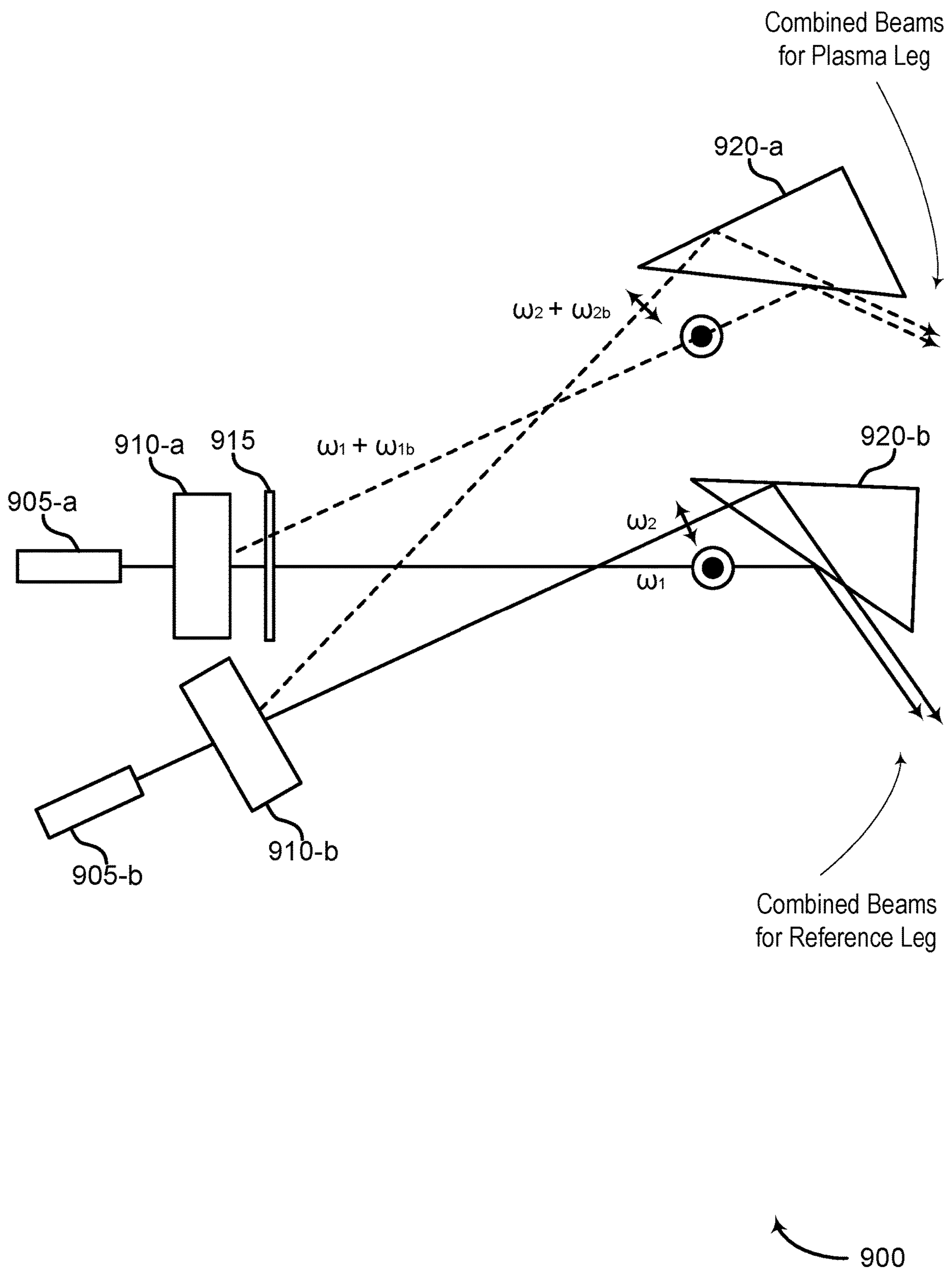
FIG. 9 shows an example of a traditional heterodyne two-color interferometer that utilizes a beam combination unit according to aspects of the present disclosure.

FIG. 9 shows an example of a traditional heterodyne two-color interferometer that utilizes a beam combination unit 920 (wedge combiner 920) according to aspects of the present disclosure. Laser diagnostics system 900 is an example of, or includes aspects of, the corresponding element described with reference to FIGS. 1-8, 10, and 11.

In one aspect, laser diagnostics system 900 includes laser source 905, modulator 910, half wave plate 915, and wedge combiner 920. Laser source 905 is an example of, or includes aspects of, the corresponding element described with reference to FIGS. 1, 6, 8, 10, and 11. Modulator 910 is an example of, or includes aspects of, the corresponding element described with reference to FIGS. 1-8, 10, and 11. Half wave plate 915 is an example of, or includes aspects of, the corresponding element described with reference to FIG. 9. Wedge combiner 920 is an example of, or includes aspects of, the corresponding element described with reference to FIGS. 3-6, 8, 10, and 11.

Referring to FIG. 9, laser source 905 includes laser source 905-*a* and laser source 905-*b* that generate laser different beams with wavelengths. According to an embodiment, laser source 905-*a* generates a laser beam with wavelength $\omega_1$. Similarly, laser source 905-*b* generates a laser beam with wavelength $\omega_2$. The laser beam of wavelength $\omega_1$ passes through modulator 910-*a* and half wave plate 915 and laser beam of wavelength $\omega_2$ passes through modulator 910-*b* to generate a phase shift as $\omega_1+\omega_{1b}$ and $\omega_2+\omega_{2b}$, respectively. In some cases, half wave plate 915 provides for the incoming laser beams (with wavelengths $\omega_{1b}$ and $\omega_1+\omega_{1b}$) to have orthogonal polarization. Finally, the beams are combined using wedge combiner 920-*a* and wedge combiner 920-*b* to generate combined beams for plasma leg and reference leg, respectively.

According to embodiment, the two-color an interferometer is a similar system to the dispersion interferometer except for the use of two separate laser sources (e.g., 905-*a* and 905-*b*). Thus, the beam combination with the wedge combiner (e.g., 920-*a* and 920-*b*) can be applied to two-color interferometry. According to some examples, the incoming beams having wavelengths $\omega_1$ and $\omega_2$ may be related as $\omega_2=2\omega_1$. However, embodiments are not limited thereto. For example, $\omega_1$=28.3 THz (10.59 μm) and $\omega_2$=65.2 THz (4.6 μm) may be possible in a two-color interferometer system.

Figure 10:
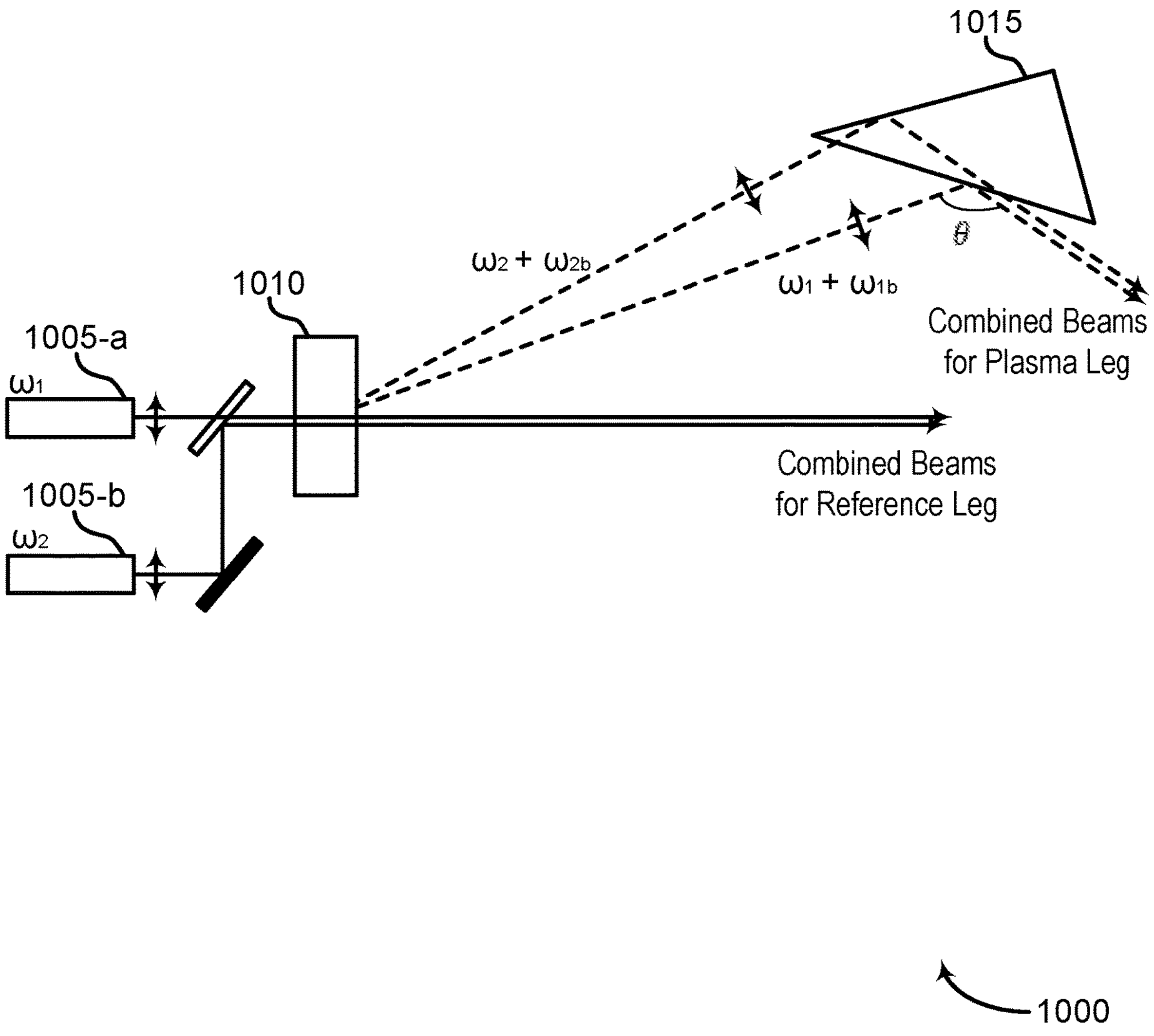
FIG. 10 shows an example of a traditional heterodyne two-color interferometer that utilizes a beam combination unit according to aspects of the present disclosure.

FIG. 10 shows an example of a traditional heterodyne two-color interferometer that utilizes a beam combination unit 1015 (wedge combiner 1015) according to aspects of the present disclosure. Laser diagnostics system 1000 is an example of, or includes aspects of, the corresponding element described with reference to FIGS. 1-9, and 11.

In one aspect, laser diagnostics system 1000 includes laser source 1005, modulator 1010, and wedge combiner 1015. Laser source 1005 is an example of, or includes aspects of, the corresponding element described with reference to FIGS. 1, 6, 8, 9, and 11. In one aspect, laser source 1005 including laser sources 1005-*a* and 1005-*b*, are examples of the corresponding element described with reference to FIG. 9. Modulator 1010 is an example of, or includes aspects of, the corresponding element described with reference to FIGS. 1-9, and 11. Wedge combiner 1015 is an example of, or includes aspects of, the corresponding element described with reference to FIGS. 3-6, 8, 9, and 11.

Referring to FIG. 10, an alternate configuration of a two-color interferometer is provided. According to an embodiment, the alternative configuration uses a modulator 1010 (e.g., a common AO cell) with two closely spaced wavelengths. In some cases, a beam combination based on wedge combiner 1015 can be applied to a two-color interferometer (i.e., in addition to a dispersion interferometer).

According to an embodiment, incoming beams with wavelengths $\omega_1$ and $\omega_2$ generated from laser sources 1005-*a* and 1005-*b* may not be limited to $\omega_2=2\omega_1$. According to an example, different wavelengths such as $\omega_1$=28.3 THz (10.59 μm) and $\omega_2$=65.2 THz (4.6 μm) may be implemented.

In some cases, the angle between the laser beam before and after reflection from the wedge combiner is considered. For example, as shown in FIG. 10, an angle θ is formed between the laser beam (of wavelength $\omega_1+\omega_{1b}$) when the said laser beam is incident on the wedge combiner 1015 and after being reflected by wedge combiner 1015.

According to some embodiments, the angle θ may be close to (e.g., approximately equal to, within ±10°, etc.) a Brewster's angle, and the reflection of the laser beam with wavelength $\omega_1+\omega_{1b}$ will be small. In some examples, the comparison of angle θ with the Brewster's angle is not considered based on exact values due to minute differences cause by variations in angles and wavelengths. Accordingly, in some cases, an appropriate coating on the wedge combiner 1015 may enable an improvement in reflectivity of the laser beam.

Figure 11:
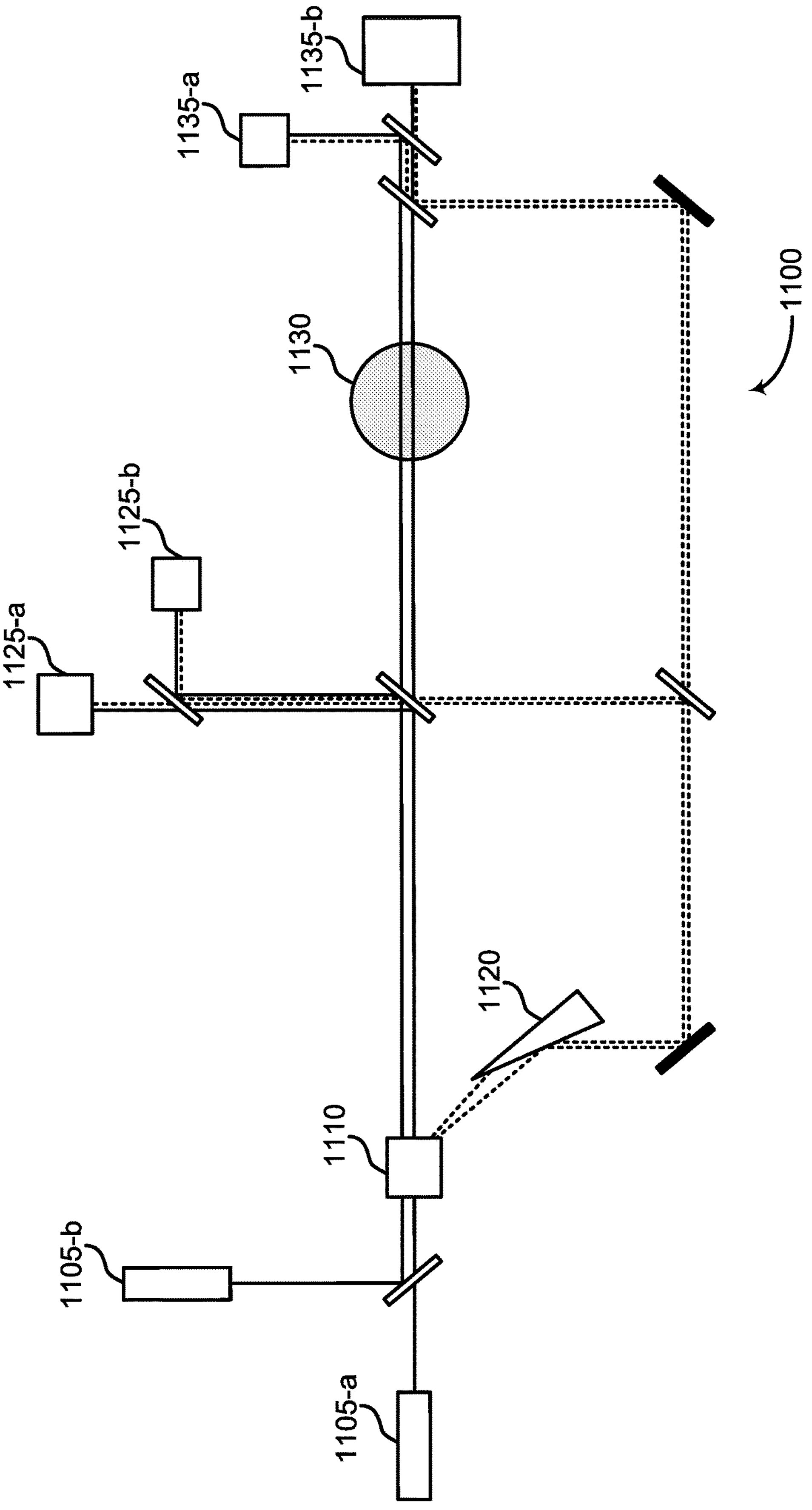
FIG. 11 shows an example of a full heterodyne two-color interferometer that utilizes a beam combination unit according to aspects of the present disclosure.

FIG. 11 shows an example of a full heterodyne two-color interferometer that utilizes a beam combination unit 1120 (wedge combiner 1120) according to aspects of the present. Laser diagnostics system 1100 is an example of, or includes aspects of, the corresponding element described with reference to FIGS. 1-10. In one aspect, laser diagnostics system 1100 includes laser source 1105, modulator 1110, beam splitters 1115, wedge combiner 1120, reference detector 1125, plasma 1130, and measure detector 1135.

Laser diagnostics system 1100 is an example of a two-color interferometer implemented according to aspects of the present disclosure. According to an embodiment, laser diagnostics system 1100 shows one possible example of a two-color interferometer configuration, including two laser sources 1105, modulator 1110, multiple beam splitters 1115, two reference detectors 1125, plasma 1130, and two measure detectors 1135 (e.g., where the wedge combiner 1120 may be implemented according to the present disclosure).

For instance, Wedge combiner 1120 is an example of, or includes aspects of, the corresponding element described with reference to FIGS. 3-6, and 8-10. The wedge combiner 1120 may be implemented in a two-color interferometer (e.g., as shown in the example of laser diagnostics system 1100) to reduce (e.g., minimize) the number of unshared optics between two wavelengths, to reduce noise or uncancelled vibrations, to simplify optical configurations, etc. In some aspects, the two-color interferometer of laser diagnostics system 1100 may be configured such that reference detector 1125-*a* and measure detector 1135-*a* correspond to (e.g. or are associated with) laser 1105-*a*, and reference detector 1125-*b* and measure detector 1135-*b* correspond to (e.g. or are associated with) laser 1105-*b*.

Moreover, laser source 1105 is an example of, or includes aspects of, the corresponding element described with reference to FIGS. 1, 6, and 8-10. Modulator 1110 is an example of, or includes aspects of, the corresponding element described with reference to FIGS. 1-10. Plasma 1130 is an example of, or includes aspects of, the corresponding element described with reference to FIGS. 1 and 6. Laser source, modulator, beam splitter, wedge combiner, and plasma are described in more detail herein, for example, at least with reference to FIGS. 1 and 6.

Figure 12:
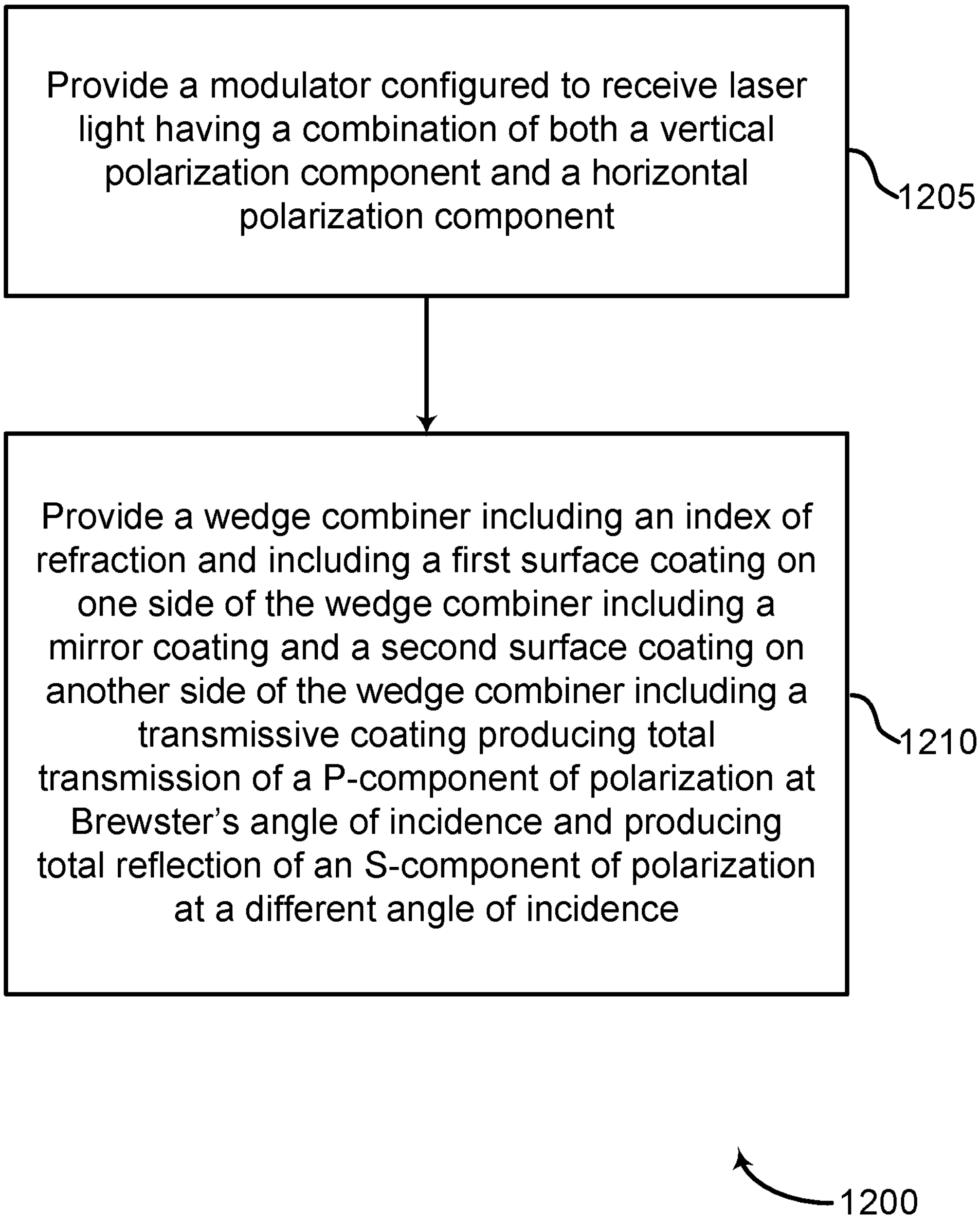
FIG. 12 shows an example of a method for laser diagnostics according to aspects of the present disclosure.

FIG. 12 shows an example of a method 1200 for laser diagnostics according to aspects of the present disclosure. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1205, the system provides a modulator configured to receive laser light having a combination of both a vertical polarization component and a horizontal polarization component, where the modulator shifts a frequency of one of the vertical polarization component and the horizontal polarization component relative to the other. In some cases, the operations of this step refer to, or may be performed by, a modulator as described with reference to FIGS. 1-11.

At operation 1210, the system provides a wedge combiner having an index of refraction and including a first surface coating on one side of the wedge combiner including a mirror coating and a second surface coating on another side of the wedge combiner including a transmissive coating producing total transmission of a P-polarization component at Brewster's angle of incidence and producing total reflection of an S-polarization component at a different angle of incidence.

In some cases, the laser light having the P-polarization component on the second surface is reflected by the first surface on the one side and the laser light having S-polarization component on the second surface is reflected by the second surface on the other side. Additionally, the laser light having P polarization as incident on the second surface combines with the laser light having S polarization as the laser light having P polarization as incident on the second surface and the laser light having S polarization departs the wedge combiner. In some cases, the operations of this step refer to, or may be performed by, a wedge combiner as described with reference to FIGS. 3-6, and 8-11.

Accordingly, an apparatus for laser diagnostics for dispersion interferometer is described. One or more aspects of the apparatus include a modulator configured to receive laser light having a combination of both a vertical polarization component t and a horizontal polarization component, wherein the modulator shifts a frequency of one of the vertical polarization component and the horizontal polarization component relative to the other; a wedge combiner having an index of refraction and comprising a first surface coating on one side of the wedge combiner comprising a mirror coating and a second surface coating on another side of the wedge combiner comprising a transmissive coating producing total transmission of a P-polarization component at Brewster's angle of incidence and producing total reflection of an S-polarization component at a different angle of incidence, wherein the laser light having the P-polarization component on the second surface is reflected by the first surface on the one side, wherein the laser light having S-polarization component on the second surface is reflected by the second surface on the other side, and wherein the laser light having P polarization as incident on the second surface combines with the laser light having S polarization as the laser light having P polarization as incident on the second surface and the laser light having S polarization departs the wedge combiner.

In some aspects, the modulator comprises an acoustic-optical cell. In some aspects, the wedge combiner comprising a wedge angle configured to combine the laser light having the second frequency with the laser light having the first frequency. In some aspects, the wedge combiner comprises a material selected from the group of materials consisting of Zinc Selenide, Zinc Sulfide, and Barium Fluoride.

In some aspects, the laser light has a frequency in a range from 25 Terahertz and 600 Terahertz. In some aspects, the laser light has the first frequency wherein the first frequency is approximately 62.8 Terahertz. In some aspects, the laser light has the second frequency wherein the second frequency is approximately 31.4 Terahertz.

Some examples of the apparatus, system, and method further include a distance between the modulator and the other side is 10 centimeters. In some aspects, the modulator has a drive frequency in a range from 10 Megahertz and 200 Megahertz.

In some aspects, an angle between the one side and the other side of the wedge combiner is in a range of between 0 and 2 degrees. In some aspects, an angle between the one side and the other side of a wedge combiner is 0.180 degrees.

In some aspects, the modulator separates the laser light into orthogonal polarization components by angles in a range of 0.3 to 15 degrees. In some aspects, the modulator is configured to receive laser light having both the first frequency and the second frequency, wherein the first frequency is a second harmonic of the second frequency.

Embodiments of the present disclosure may be able to replace existing interferometer systems. In some cases, a two-color interferometer has been used for fusion plasma diagnostics. A dispersion interferometer is commonly being used and dispersion interferometers were installed instead of the two-color interferometer on some fusion plasma devices because of its immunity to mechanical vibration and a simplified configuration.

Embodiments of the disclosure can further improve the resolution of the dispersion interferometer. According to some embodiments, since the beam combination parts can be provided as a package in a single unit, the users can avoid complications the working of beam alignment (e.g., precise alignment of beam combination and degradation of the beam combination). Two examples of such a package and components thereof are depicted by the dashed lines in FIGS. 5 and 6. Since the disclosure enables a higher resolution and easier alignment of the interferometer, users may be encouraged to replace their existing interferometer systems to a unit based on the present disclosure.

While the invention herein disclosed has been described by means of specific embodiments, examples and applications thereof, numerous modifications and variations could be made thereto by those skilled in the art without departing from the scope of the invention set forth in the claims.

What is claimed is:

1. A laser beam combiner comprising:

a modulator configured to receive laser light having a combination of both a vertical polarization component and a horizontal polarization component, wherein the modulator shifts a frequency of one of the vertical polarization component and the horizontal polarization component relative to the other; and a wedge combiner having an index of refraction and comprising:

a first surface coating on one side of the wedge combiner comprising a mirror coating, and a second surface coating on other side of the wedge combiner comprising a transmissive coating producing total transmission of a P-polarization component at Brewster's angle of incidence and producing total reflection of an S-polarization component at a different angle of incidence;

wherein said laser light having the P-polarization component on the second surface coating is reflected by the first surface coating on the one side;

wherein said laser light having S-polarization component on the second surface coating is reflected by said second surface coating on the other side; and wherein said laser light having P polarization component as incident on the second surface coating combines with said laser light having S polarization component as said laser light having P polarization component as incident on the second surface coating and said laser light having S polarization component departs said wedge combiner.

2. The laser beam combiner of claim 1 further comprising:

said modulator, wherein said modulator comprises an acoustic-optical cell.

3. The laser beam combiner of claim 1 further comprising:

said wedge combiner comprising a wedge angle configured to combine the laser light having a second frequency with the laser light having a first frequency.

4. The laser beam combiner of claim 1 further comprising:

said wedge combiner comprises a material selected from the group of materials consisting of Zinc Selenide, Zinc Sulfide, and Barium Fluoride.

5. The laser combiner of claim 1 further comprising:

said laser light has a frequency in a range from 25 Terahertz and 600 Terahertz.

6. The laser beam combiner of claim 1 wherein:

said laser light has a first frequency wherein said first frequency is approximately 62.8 Terahertz.

7. The laser beam combiner of claim 1 wherein:

said laser light has a first frequency wherein said first frequency is approximately 31.4 Terahertz.

8. The laser beam combiner of claim 1 further comprising:

said modulator, wherein said modulator has a drive frequency in a range from 10 Megahertz to 200 Megahertz.

9. The laser beam combiner of claim 1 further comprising:

said wedge combiner wherein an angle between the one side and the other side is in a range of between 0 and 2 degrees.

10. The laser beam combiner of claim 1 further comprising:

said wedge combiner wherein an angle between the one side and the other side is 0.180 degrees.

11. The laser beam combiner of claim 1 further comprising:

said modulator wherein said modulator separates said laser light into orthogonal polarization components by angles in a range of 0.3 to 15 degrees.

12. The laser beam combiner of claim 1 further comprising:

said modulator configured to receive laser light having both a first frequency and a second frequency, wherein said first frequency is a second harmonic of said second frequency.

13. A method of making a laser beam combiner comprising:

providing a modulator configured to receive laser light having a combination of both a vertical polarization component and a horizontal polarization component, wherein the modulator shifts a frequency of one of the vertical polarization component and the horizontal polarization component relative to the other; and providing a wedge combiner having an index of refraction and comprising:

a first surface coating on one side of the wedge combiner comprising a mirror coating, and a second surface coating on other side of the wedge combiner comprising a transmissive coating producing total transmission of a P-polarization component at Brewster's angle of incidence and producing total reflection of an S-polarization component at a different angle of incidence;

wherein said laser light having the P-polarization component on the second surface coating is reflected by the first surface coating on the one side;

wherein said laser light having S-polarization component on the second surface coating is reflected by the second surface coating on the other side; and wherein said laser light having P polarization component as incident on the second surface coating combines with said laser light having S polarization component as said laser light having P polarization component as incident on the second surface coating and said laser light having S polarization component departs said wedge combiner.

14. The method of claim 13 further comprising:

said providing said modulator, wherein said modulator comprises an acoustic-optical cell.

15. The method of claim 13 further comprising:

providing said wedge combiner comprising a wedge angle configured to combine the laser light having a second frequency with the laser light having a first frequency.

16. The method of claim 13 further comprising:

said providing said wedge combiner comprising a material selected from the group of materials consisting of Zinc Selenide, Zinc Sulfide, and Barium Fluoride.

17. The method of claim 13 wherein:

said laser light has a frequency in a range from 25 Terahertz and 600 Terahertz.

18. The method of claim 13 wherein:

said laser light has a first frequency wherein said first frequency is approximately 62.8 Terahertz.

19. The method of claim 13 wherein:

said laser light has a first frequency wherein said first frequency is approximately 31.4 Terahertz.

20. The method of claim 13 further comprising:

said modulator, wherein said modulator has a drive frequency in a range from 10 Megahertz to 200 Megahertz.

21. The method of claim 13 further comprising:

said providing said wedge combiner wherein an angle between the one side and the other side is in a range of between 0 and 2 degrees.

22. The method of claim 13 further comprising:

said providing said wedge combiner wherein an angle between the one side and the other side is 0.180 degrees.

23. The method of claim 13 further comprising:

said modulator wherein said modulator separates said laser light into orthogonal polarization components by angles in a range of 0.3 to 15 degrees.

24. The method of claim 13 further comprising:

said providing said modulator configured to receive laser light having both a first frequency and a second frequency, wherein said first frequency is a second harmonic of said second frequency.

* * * * *